United States Patent
Bae et al.

Patent Number: 5,691,840
Date of Patent: Nov. 25, 1997

[54] VIDEO MICROSCOPE

[75] Inventors: Jaewoo Bae; Haenam Jeon, both of Suwon-si, Rep. of Korea

[73] Assignee: Samsung Aerospace Industries, Ltd., Kyeongsangnam-do, Rep. of Korea

[21] Appl. No.: 555,113

[22] Filed: Nov. 8, 1995

[30] Foreign Application Priority Data

Dec. 7, 1994 [KR] Rep. of Korea ............... 94-33174

[51] Int. Cl.$^6$ .............................. G02B 21/06; H04N 7/18
[52] U.S. Cl. .................... 359/386; 359/389; 348/79
[58] Field of Search ....................... 359/368, 369, 359/370, 371, 383, 385, 386, 811, 821, 363; 348/79

[56] References Cited

U.S. PATENT DOCUMENTS

| | | | |
|---|---|---|---|
| 5,386,317 | 1/1995 | Corle et al. | 359/386 |
| 5,559,630 | 9/1996 | Ho et al. | 359/371 |

FOREIGN PATENT DOCUMENTS

| | | | |
|---|---|---|---|
| 0032116 | 4/1981 | Japan | 359/385 |

*Primary Examiner*—Paul M. Dzierzynski
*Assistant Examiner*—Mark Robinson
*Attorney, Agent, or Firm*—Christie, Parker & Hale, LLP

[57] ABSTRACT

Described in this invention is a microscope that can examine a specimen of an anisotropic property regardless of the specimen being thin or thick, i.e., opaque or transparent. The video microscope includes a first light guide for a transmission method; a first polarizer for partially polarizing the light from the first light source, arranged beneath a stage on which a specimen is placed; a second light guide for reflection method; a second polarizer for partially polarizing the light from the second light source, provided in the second light guide; a lens assembly admitting the polarized light from the first or second polarizer and including an objective, an analyzer, and a compensating plate; a beam splitter for reflecting the polarized light from the second polarizer to an object provided in the lens assembly; a CCD mount in which CCD is provided, mounted on the lens assembly; and height and focus adjustment.

8 Claims, 4 Drawing Sheets

VIDEO MICROSCOPE

BACKGROUND OF THE INVENTION

(1) Field of the Invention

The invention relates to a video microscope which can obtain an image by a transmission method and/or a reflection method, and thereby achieves an easy examination by mounting a freely rotatable polarizer and an analyzer.

(2) Description of the Prior Art

A microscope is a device that examines a specimen by creating a magnified image of an object, and a polarization microscope is used for examining a specimen which has an anisotropic property. A polarization microscope employs a transmission method and the specimen should be thin so that light can pass through it.

FIG. 5 shows a conventional polarization microscope including a base plate 100 as the foundation in which a light source 120, a collector lens 122, and a reflecting plate 124 are provided; an arm 102 erected from the base plate, having a focus control device 110; a lens assembly 106 supported by the arm 102 and having an eyepiece 104, a prism 112, a compensating plate 114, an analyzer 115, and an objective 116; and a stage 108 for placing a specimen thereon, in which a polarizer 118 is provided.

The polarized image of the specimen is picked up in the eyepiece by the working of the polarizer 118 and the analyzer 115.

But the above conventional polarization microscope is limited because it can only examine a very thin or transparent specimen, i.e., a specimen through which light can pass.

SUMMARY OF THE INVENTION

An object of the invention is to provide a microscope that can examine a specimen which has an anisotropic property regardless of the specimen being thin or thick, i.e., opaque or transparent.

Another object of the invention is to provide a microscope that can perform an easy examination.

By the above objectives, the invention provides a video microscope, which employs a reflection method as well as a transmission method, including a first light guide for a transmission method; a first polarizer for partially polarizing the light from the first light source, arranged beneath a stage on which a specimen is placed; a second light guide as a reflection method; a second polarizer for partially polarizing the light from the second light source, provided in the second light guide; a lens assembly admitting the polarized light from the first or second polarizer and including an objective, analyzer, and a compensating plate; a beam splitter for reflecting the polarized light from the second polarizer to an object provided in the lens assembly; a CCD mount in which CCD is provided and mounted on the lens assembly; and a means for adjusting the height and focus.

BRIEF DESCRIPTION OF THE DRAWINGS

The invention is described in detail with reference to the drawings.

DESCRIPTION OF THE PREFERRED EMBODIMENT

Now, a preferred embodiment of the invention is described with reference to the drawings.

Figure 1:
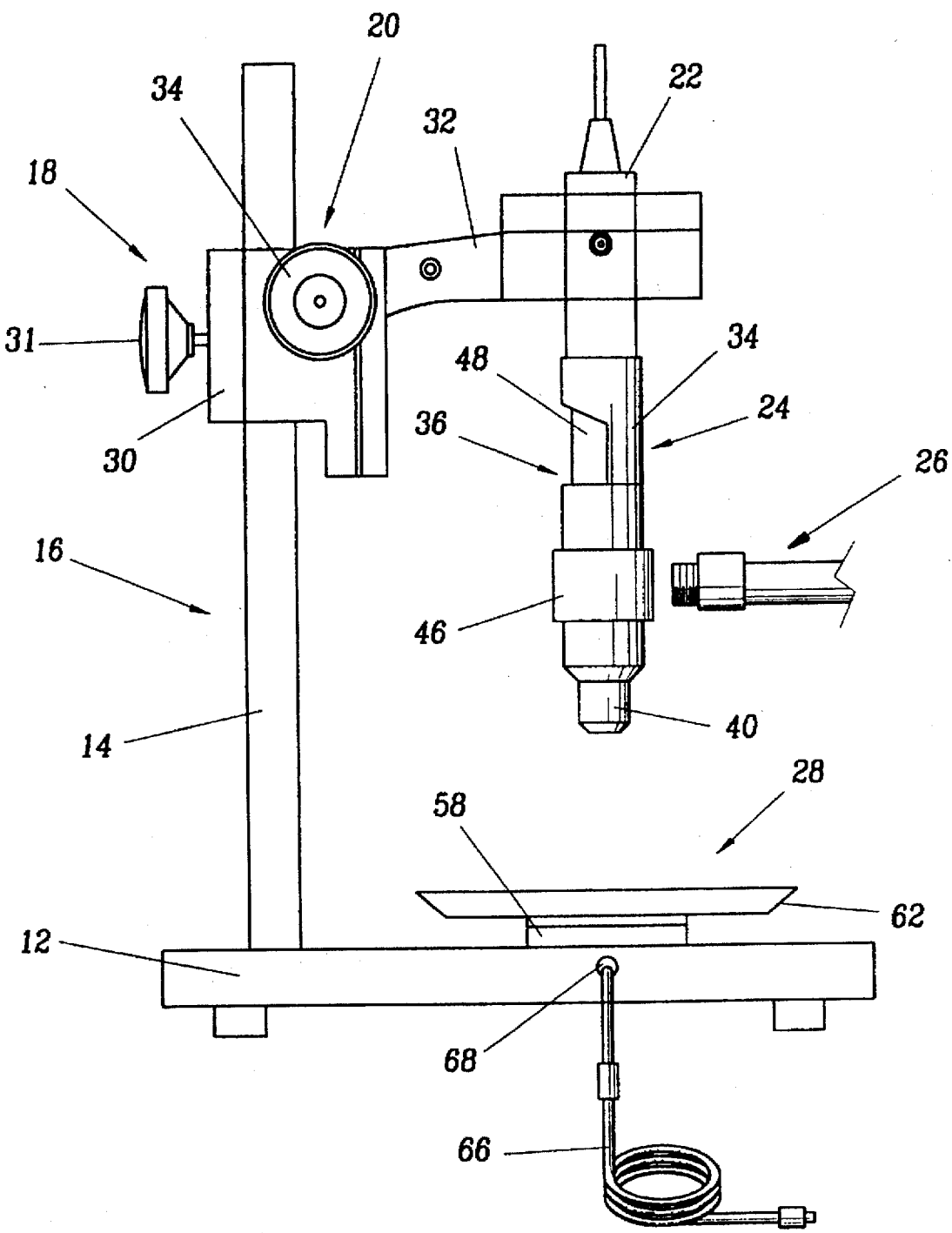
FIG. 1 is a schematic view showing the construction of the microscope according to a preferred embodiment of the invention.

Referring to FIG. 1, there is a stand 16 which includes a base 12 as a foundation and an arm 14 erected from the base. A height adjustment means 18 and a focus adjusting means 20 are provided for the arm 14 and a charge coupled device (CCD) mount 22 is mounted on the focus adjusting means 20.

A lens assembly 24 is assembled to the CCD mount 22 beneath the CCD mount and a second light guide 26 is combined (in FIG. 1 it is shown as separated) at one side of the lens assembly for examining a specimen by a reflection method.

A stage 28 is located on the base and beneath the lens assembly for placing the specimen thereon.

The height adjusting means 18 includes a first slider 30 through which the arm 14 passes upwardly and a knob 31 threaded to the first slider 30 which passes through the first slider to contact with the arm 14. The height is adjusted by tightening and loosening the knob 31 to fix and to loosen the first slider 30 to the arm 14, respectively.

The focus adjusting means 20 includes a second slider 32 slidably mounted on the first slider 30 by a dovetail method and a focusing knob 34 mounted on the first slider 30.

The second slider 32 can be moved upwardly or downwardly to adjust the focus in accordance with the revolution of the focusing knob 34 by means of, for example, rack and pinion.

The CCD 22 mounted on the second slide 32 works as a screen on which an image is projected by the lenses.

Figure 2:
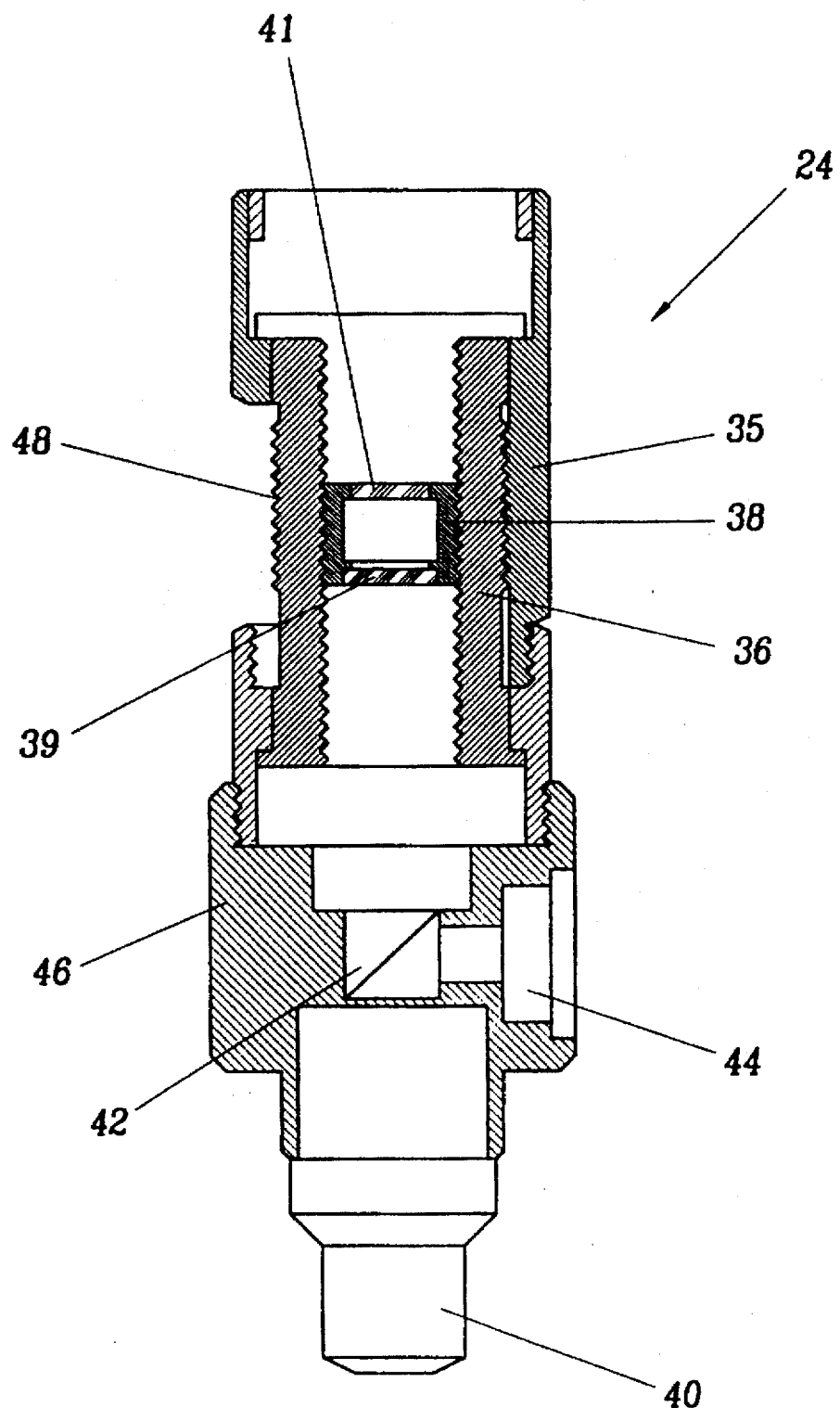
FIG. 2 is a partial cross-sectional view of a lens assembly in FIG. 1.

A lens assembly 24 includes, as shown in FIG. 2, an outer cylinder 35; a rotatable cylinder 36 rotatably fitted to the outer cylinder; an analyzer 39; a compensating plate 41; a holder 38 for holding the analyzer 39 and the compensating plate 41 mounted on the rotatable cylinder 36, as a result, the analyzer rotates in accordance with the rotation of the rotatable cylinder 36; a beam splitter case 46 combined with the outer cylinder 35 at the lower end of the outer cylinder and having a hollow hole 44 being internally screwed for a second light guide 26; a beam splitter 42 for reflecting a polarized light from the second light guide to the specimen, provided in the beam splitter case 46; and an objective 40 mounted on the lower part of the beam splitter case.

For example, as shown in FIG. 2, there is a hollow space at one side of the outer cylinder to expose the rotatable cylinder and there is a knurling at the exposed portion of the rotatable cylinder, by which the rotation of the rotatable cylinder is easily achieved.

Figure 3:
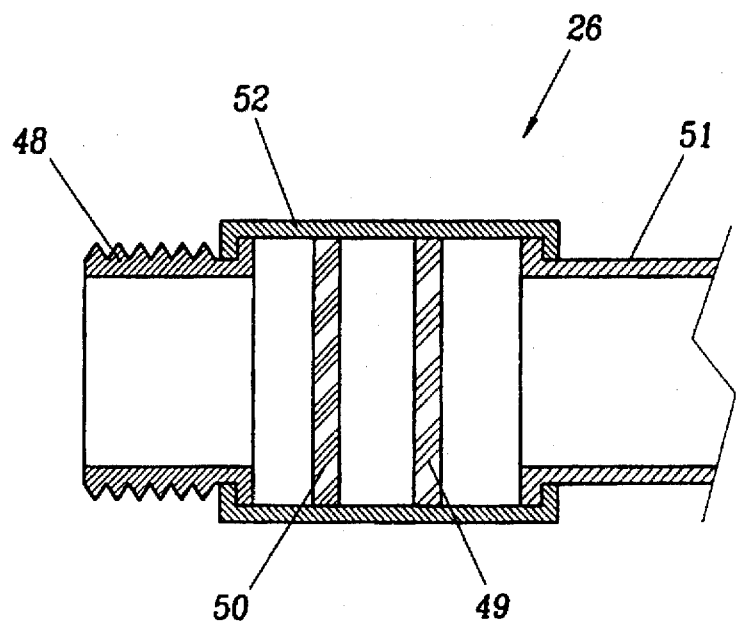
FIG. 3 is a partial cross-sectional view of a second light guide in FIG. 1.

The second light guide 26 is assembled to the hollow hole 44 for examining the specimen by the reflection method and includes, as shown in FIG. 3, a connection cylinder 48, the peripheral surface thereof being screwed for being threaded to the beam splitter case through the hollow hole 44; a polarizer 50; a lens 49; and a rotatable cylinder 52, on which the polarizer 50 and the lens 49 are fixedly mounted, rotatably fitted to the connection cylinder 48, as a result, the polarizer rotates in accordance with the rotation of the rotatable cylinder 52.

Through the rear portion 51 of the second light guide 26, a light is transmitted from a light source (not shown) to the lens 49 for collecting the light and the light is partially polarized in the polarizer 50, and then is transmitted to the beam splitter 42.

The stage 28 is structured so that a polarizer and a first light guide are provided in the central part of the stage and can rotate the polarizer. The light from the first light guide is partially polarized in the polarizer, then is transmitted to the lens assembly 24.

Figure 4:
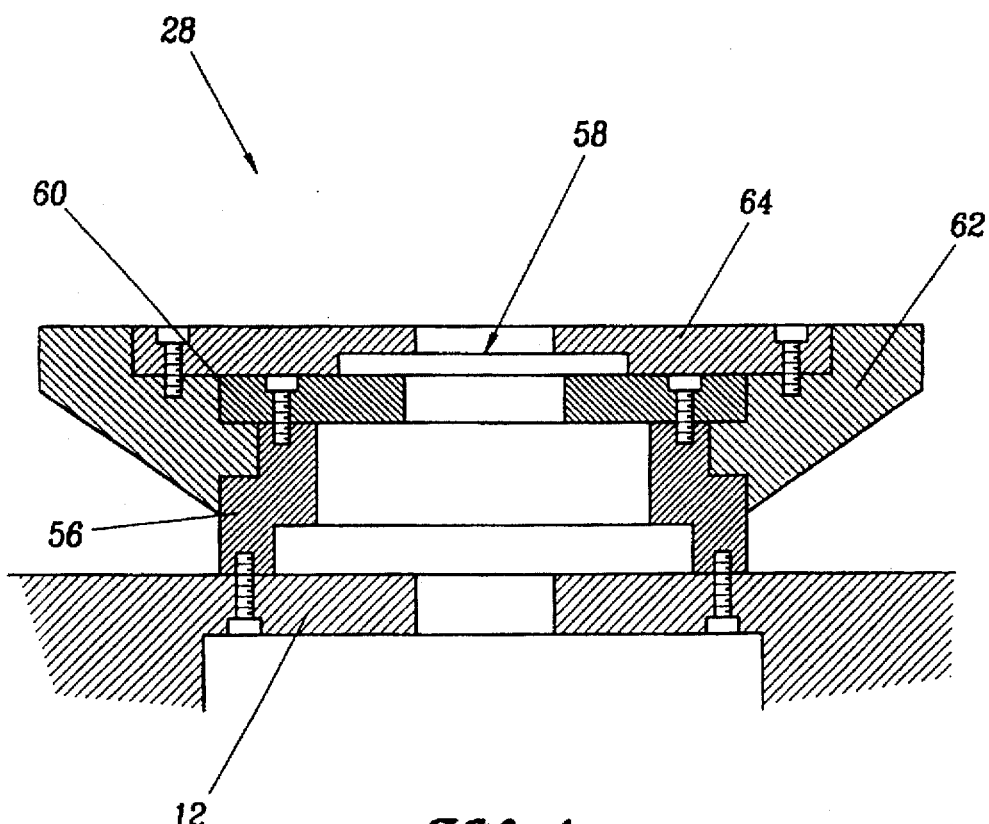
FIG. 4 is a partial cross-sectional view of a stage in FIG. 1.
Figure 5:
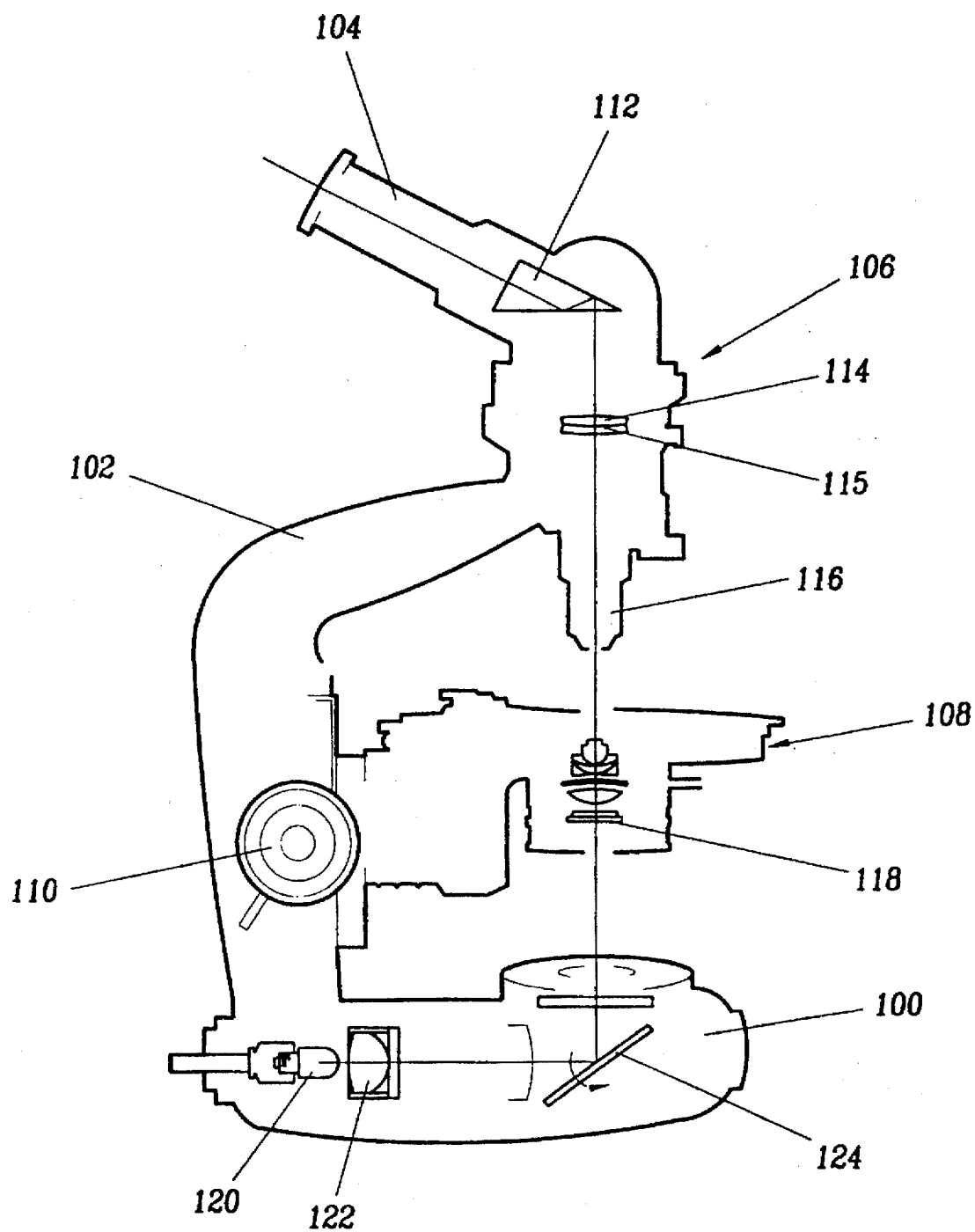
FIG. 5 is a view showing a conventional microscope.

For example, as shown in FIG. 4, the stage 28 includes a spacer 56 fixedly mounted on the base 12 and having a hollow hole at the central part of the spacer; a lower plate 60 fixedly mounted on the spacer 56 and having a hollow hole at the central part of the lower plate; a polarizer 58 placed on the lower plate 60 and at the central part of the stage; a rotatable plate 62 covering the outer surfaces of the spacer 56 and the lower plate 60 and rotatably mounted on the spacer 56 and the lower plate 60; and an upper plate 64 fixedly mounted on the rotatable plate 62, having a hollow hole at the central part of the upper plate and the polarizer 58 being fixedly mounted on the central part of the upper plate.

The polarizer 58 rotates as the rotatable plate 62 is rotated.

In the base 12, the first light guide 66 for the transmission method and a reflector 68 are provided.

The light guide 66 is also connected to a light source (not shown) and transmits the light from the light source to the polarizer 58.

In the reflection method, the polarized light in the polarizer 50 is reflected to the specimen by the beam splitter 42.

In the transmission method, the light from the first light guide 66 in the base 12 is transmitted to the polarizer 58 to partially polarize the light. Then the light passes through the specimen.

The light polarized by the above transmission method or reflection method is picked up by the objective 40 and is transmitted through the analyzer 39 and the compensating plate 41 to the CCD 22.

Accordingly, a user can examine the specimen by the transmission method and/or reflection method and can handle the polarizer and the analyzer easily by rotating the rotatable plate and the rotatable cylinder, respectively.

What is claimed is:

1. A video microscope, comprising:

a stage for receiving a specimen;

a first light guide for a transmission method;

a first polarizer, positioned below said stage, for partially polarizing light in the first light guide from a first light source;

a second light guide for a reflection method;

a second polarizer for partially polarizing light in the second light guide from a second light source;

a lens assembly for emitting the polarized light from the first or second polarizer, said lens assembly comprising:

an outer cylinder, a rotatable cylinder rotatably fitted to the outer cylinder, an analyzer, a compensating plate, a holder, mounted on the rotatable cylinder, for holding the analyzer and the compensating plate, the analyzer being rotated in accordance with the rotation of the rotatable cylinder, a beam splitter case at a lower end of the outer cylinder, and having an internally threaded hollow hole for the second light guide, an objective mounted on a lower part of the beam splitter case, and a beam splitter, positioned in the beam splitter case, for reflecting the polarized light from the second polarizer to the objective;

a CCD mount comprising a CCD mounted on the lens assembly; and means for adjusting the height and focus of said lens assembly.

2. The video microscope according to claim 1 wherein the outer cylinder comprises a hollow space at one side to expose the rotatable cylinder, and the rotatable cylinder comprises a knurling at the exposed portion by which the rotation of the rotatable cylinder is easily achieved.

3. The video microscope according to claim 1 wherein the second light guide comprises:

a connection cylinder having a threaded peripheral surface for screwing to the beam splitter case through the hollow hole;

the second polarizer;

a lens; and a rotatable cylinder, on which the second polarizer and the lens are fixedly mounted, rotatably fitted to the connection cylinder, the second polarizer being rotated in accordance with the rotation of the rotatable cylinder.

4. The video microscope according to claim 1 wherein the stage comprises the first polarizer and the first light guide, the first polarizer being rotatable therein.

5. The video microscope according to claim 4 wherein the stage includes:

a base;

a spacer fixedly mounted on the base, and having a hollow hole at a central part thereof;

a lower plate fixedly mounted on the spacer, and having a hollow hole at a central part thereof;

the first polarizer positioned on the lower plate and at a central part of the stage;

a rotatable plate covering outer surfaces of the spacer and the lower plate: and rotatably mounted on the spacer and the lower plate, and an upper plate fixedly mounted on the rotatable plate, and having a hollow hole at a central part of the upper plate, the first polarizer being fixedly mounted on the central part of the upper plate.

6. The video microscope according to claim 3 wherein the stage comprises the first polarizer and the first light guide, the first polarizer being rotatable therein.

7. The video microscope according to claim 6 wherein the outer cylinder comprises a hollow space at one side to expose the rotatable cylinder, and the rotatable cylinder comprises a knurling at the exposed portion by which the rotation of the rotatable cylinder is easily achieved.

8. The video microscope according to claim 7 wherein the stage includes:

a base;

a spacer fixedly mounted on the base, and having a hollow hole at a central part thereof;

a lower plate fixedly mounted on the spacer and having a hollow hole at a central part thereof;

the first polarizer positioned on the lower plate and at a central part of the stage;

a rotatable plate covering outer surfaces of the spacer and the lower plate, and rotatably mounted on the spacer and the lower plate; and an upper plate fixedly mounted on the rotatable plate, and having a hollow hole at a central part of the upper plate, the first polarizer being fixedly mounted on the central part of the upper plate.

* * * * *